United States Patent
Palmer et al.

(10) Patent No.: US 12,037,127 B2
(45) Date of Patent: Jul. 16, 2024

(54) HYDROGEN-FUELLED AIRCRAFT POWER SYSTEM

(71) Applicant: ROLLS-ROYCE plc, London (GB)

(72) Inventors: Chloe Jo Palmer, Derby (GB); Jacopo Tacconi, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/184,804

(22) Filed: Mar. 16, 2023

(65) Prior Publication Data

US 2023/0391467 A1    Dec. 7, 2023

(30) Foreign Application Priority Data

Apr. 11, 2022    (GB) ..................... 2205244

(51) Int. Cl.
| | |
|---|---|
| B64D 37/30 | (2006.01) |
| F02C 3/20 | (2006.01) |
| F02C 7/22 | (2006.01) |
| F02C 9/40 | (2006.01) |
| H01M 8/04007 | (2016.01) |
| B64D 27/02 | (2006.01) |
| B64D 27/10 | (2006.01) |
| B64D 41/00 | (2006.01) |
| F02C 7/18 | (2006.01) |
| H01M 8/04082 | (2016.01) |
| H01M 8/04111 | (2016.01) |

(52) U.S. Cl.
CPC ............... *B64D 37/30* (2013.01); *F02C 3/20* (2013.01); *F02C 7/22* (2013.01); *F02C 9/40* (2013.01); *H01M 8/04074* (2013.01); *B64D 27/026* (2024.01); *B64D 27/10* (2013.01); *B64D 2041/005* (2013.01); *F02C 7/18* (2013.01); *F05D 2260/232* (2013.01); *H01M 8/04111* (2013.01); *H01M 8/04208* (2013.01); *H01M 2250/20* (2013.01)

(58) Field of Classification Search
CPC .. B64D 37/30; B64D 27/10; B64D 2027/026; B64D 2041/005; F02C 3/20; F02C 7/22; F02C 9/40; H01M 8/04074
See application file for complete search history.

(56) References Cited

U.S. PATENT DOCUMENTS

| | | | | |
|---|---|---|---|---|
| 4,569,199 | A * | 2/1986 | Klees | F02C 6/206 60/773 |
| 5,968,680 | A * | 10/1999 | Wolfe | H01M 8/04111 429/495 |
| 9,638,102 | B2 * | 5/2017 | Kobayashi | F01K 13/02 |

(Continued)

FOREIGN PATENT DOCUMENTS

EP    3885267 A1    9/2021

OTHER PUBLICATIONS

Great Britain search report dated Oct. 5, 2022, issued in GB Patent Application No. 2205244.3.

*Primary Examiner* — Gerald L Sung
*Assistant Examiner* — Rene D Ford
(74) *Attorney, Agent, or Firm* — Barnes & Thornburg LLP

(57) ABSTRACT

A hydrogen-fuelled aircraft power system incorporates a gas turbine engine and a fuel cell, in which air supply and cooling of the fuel cell is integrated with the gas turbine engine to improve overall efficiency of the power system. The system may be part of a turbofan, turboprop or electric propulsion system for an aircraft.

20 Claims, 3 Drawing Sheets

(56) References Cited

U.S. PATENT DOCUMENTS

| | | | |
|---|---|---|---|
| 11,230,156 B2 * | 1/2022 | Kim | B60L 58/33 |
| 11,724,815 B2 * | 8/2023 | Mackin | B64D 47/00 |
| | | | 60/801 |
| 2018/0114995 A1 | 4/2018 | Stoia et al. | |
| 2018/0301719 A1 * | 10/2018 | Orozco | H01M 8/04201 |
| 2022/0297844 A1 | 9/2022 | Mackin et al. | |

* cited by examiner

HYDROGEN-FUELLED AIRCRAFT POWER SYSTEM

CROSS-REFERENCE TO RELATED PATENT APPLICATIONS

This specification is based upon and claims the benefit of priority from United Kingdom Patent Application No. GB 2205244.3, filed on Apr. 11, 2022, the entire contents of which are herein incorporated by reference.

BACKGROUND

Technical Field

The present disclosure relates to a hydrogen-fuelled aircraft power system comprising a gas turbine engine and hydrogen fuel cell.

Description of Related Art

The use of hydrogen as an alternative to liquid hydrocarbon fuels for aircraft propulsion poses technical problems. Given the low density of hydrogen in gaseous form, storing significant quantities requires either high pressures at ambient temperatures or at low pressures in liquid form at cryogenic temperatures. For aircraft applications, cryogenic storage is a more practical solution, given the ability to store larger quantities at low pressures and with reduced overall weight and volume. Providing a supply of gaseous fuel to generate power, whether by way of a gas turbine or a fuel cell, requires the liquid fuel supply to be heated from cryogenic temperatures prior to being reacted or combusted. Additional and differently configured features and control systems are required to control the supply of hydrogen fuel compared to those used for a conventional liquid hydrocarbon fuel such as kerosene.

As well as potentially replacing conventional liquid hydrocarbon fuel for use in gas turbine engines, hydrogen can be used to generate electrical power directly through being oxidised in a hydrogen fuel cell. While gas turbines are advantageous in generating large amounts of power in kinetic form that can be used to provide propulsion, fuel cells can be used to generate smaller amounts of electrical power to support electrically powered services that would otherwise require generation by an electrical machine driven by a gas turbine engine. A combination of a gas turbine with a hydrogen fuel cell may therefore be advantageous, given the need in aircraft for both propulsive thrust and electrical power.

A conventional aircraft gas turbine engine will typically supply a proportion of output shaft power via an electrical generator to service electrical aircraft systems, including those on the engine itself. The proportion of electrical power is currently a small but significant proportion of total engine power, and is likely to be become greater for newer more electrified vehicles. Fuel cells offer the possibility of directly and efficiently converting stored fuel energy into electrical power without the need for combustion and mechanical to electrical conversion beforehand. Fuel cells are, however, limited in power density, making their use for propulsive applications less attractive.

A gas turbine engine is capable of operating more efficiently when used for generating propulsive power alone. When hydrogen is used as a fuel source, the power requirements for pumping fuel from liquid hydrogen in a cryogenic tank to gaseous form at the gas turbine are increased substantially compared to an equivalent conventional fuelled engine. A fuel cell may therefore be able to generate at least some of the electrical supply that the engine would otherwise need to provide, resulting in an overall gain in thermal efficiency. A problem, however, lies in how to implement a system that can operate efficiently using both a gas turbine engine and a fuel cell.

SUMMARY

According to an example, there is provided a hydrogen-fuelled aircraft power system comprising:
 a hydrogen fuel supply system configured to provide a flow of gaseous hydrogen fuel;
 a hydrogen fuel cell having an anode inlet connected to receive a first portion of the flow of gaseous hydrogen fuel from the hydrogen fuel supply system, a cathode air inlet, a cathode exhaust and a cooling flow path;
 a gas turbine engine having a compressor, a combustor connected to receive a second portion of the flow of gaseous hydrogen fuel from the hydrogen fuel supply system, and a turbine;
 a first heat exchanger having first and second fluid flow paths, the first fluid flow path of the first heat exchanger being between the hydrogen fuel supply system and the fuel cell anode inlet, the fuel cell cooling flow path passing through the second fluid flow path of the first heat exchanger; and
 a second heat exchanger having first and second fluid flow paths, the first fluid flow path of the second heat exchanger connected between a compressor bleed line and a cathode air inlet line connected to the fuel cell cathode air inlet, a cathode exhaust line from the fuel cell cathode exhaust passing through the second fluid flow path of the second heat exchanger towards an exhaust.

The hydrogen-fuelled aircraft power system may further comprise a first electrical machine connected to the gas turbine engine.

The gas turbine engine may be part of a turboprop engine, the system comprising a propellor connected to the gas turbine engine. The gas turbine engine may alternatively be part of a turbofan engine, the system comprising a fan connected to the gas turbine engine.

The hydrogen fuel supply system may comprise a cryogenic hydrogen storage tank, a pre-heater and a third heat exchanger, the hydrogen fuel supply system configured to provide the flow of gaseous hydrogen fuel from the third heat exchanger heated by the pre-heater.

The cathode air inlet line may comprise a cathode air inlet turbine connected to drive a second electrical machine.

The cathode exhaust line may comprise a cathode exhaust turbine connected to drive a third electrical machine.

The second fluid flow path of the second heat exchanger may for example be between the cathode exhaust and the cathode exhaust turbine.

The gas turbine engine may further comprise a recuperator at an outlet of the turbine, the cathode exhaust line passing through the recuperator between the second fluid flow path of the second heat exchanger and the cathode exhaust turbine.

According to another example, there is provided a method of operating a hydrogen-fuelled aircraft power system, the method comprising:
 providing a flow of gaseous hydrogen fuel from a hydrogen fuel supply system;

passing the flow of gaseous hydrogen fuel from the hydrogen fuel supply system through a first fluid flow path of a first heat exchanger;

receiving a first portion of the flow of gaseous hydrogen fuel from the hydrogen fuel supply system at an anode inlet of a hydrogen fuel cell, the hydrogen fuel cell having a cathode air inlet, a cathode exhaust and a cooling flow path;

receiving a second portion of the flow of gaseous hydrogen fuel from the hydrogen fuel supply system at a combustor of a gas turbine engine, the gas turbine engine having a compressor and a turbine;

passing cooling fluid through the cooling flow path in the hydrogen fuel cell through a second fluid flow path of the first heat exchanger;

passing air from the compressor through a compressor bleed line, through a first fluid flow path of a second heat exchanger and a cathode air inlet line to the fuel cell cathode air inlet; and passing exhaust gas from the cathode exhaust through a second fluid flow path of the second heat exchanger to an exhaust.

The method may further comprise driving a first electrical machine with the gas turbine engine.

The method may comprise driving a propellor connected to the gas turbine engine or may comprise driving a fan connected to the gas turbine engine.

The hydrogen fuel supply system may comprise a cryogenic hydrogen storage tank, a pre-heater and a third heat exchanger, the hydrogen fuel supply system providing the flow of gaseous hydrogen fuel from the third heat exchanger heated by the pre-heater.

The cathode air inlet line may comprise a cathode air inlet turbine connected to drive a second electrical machine.

The cathode exhaust line may comprise a cathode exhaust turbine connected to drive a third electrical machine.

The second fluid flow path of the second heat exchanger may be between the cathode exhaust and the cathode exhaust turbine.

The gas turbine engine may comprise a recuperator at an outlet of the turbine, the cathode exhaust line passing through the recuperator between the second fluid flow path of the second heat exchanger and the cathode exhaust turbine.

DESCRIPTION OF THE DRAWINGS

Examples are described below with reference to the accompanying drawings which are purely schematic and not to scale.

DETAILED DESCRIPTION

Figure 1:
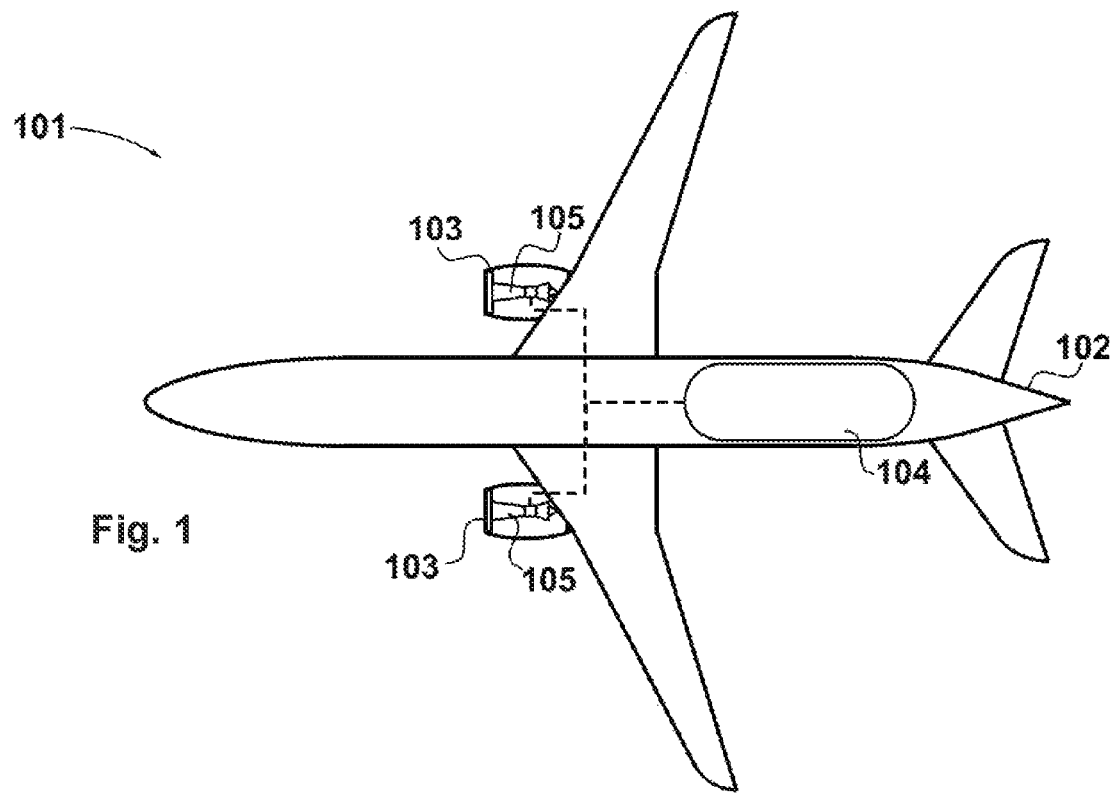
FIG. 1 is a schematic diagram of an example hydrogen-fuelled airliner comprising hydrogen-fuelled turbofan engines.

A hydrogen-fuelled airliner is illustrated schematically in FIG. 1. In this example, the airliner 101 is of substantially conventional tube-and-wing twinjet configuration with a central fuselage 102 and substantially identical underwing-mounted turbofan engines 103. The turbofan engines 103 may for example be geared turbofan engines.

A hydrogen storage tank 104 located in the fuselage 104 for a hydrogen fuel supply is connected with core gas turbines 105 in the turbofan engines 103 via a fuel delivery system. In the illustrated example, the hydrogen storage tank 104 is a cryogenic hydrogen storage tank that stores the hydrogen fuel in a liquid state, i.e. at or below around 20 K. The hydrogen fuel may be pressurised to between around from 1 to 3 bar, for example around 2 bar.

Figure 2:
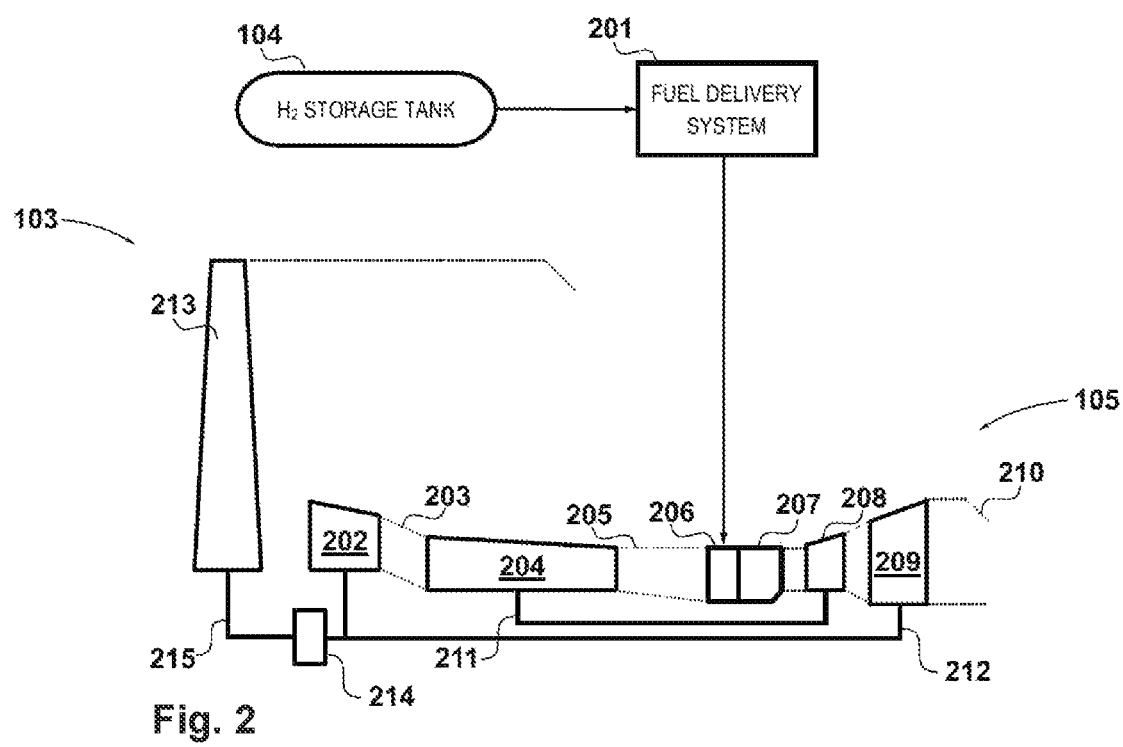
FIG. 2 is a schematic diagram illustrating flow of hydrogen fuel from a storage tank to a turbofan engine.

A schematic block diagram illustrating the flow of hydrogen fuel to a gas turbine engine is shown in FIG. 2. Hydrogen fuel is obtained from a hydrogen storage tank 104 by a fuel delivery system 201 and is supplied to a core of a gas turbine 105. Only one of the gas turbines is shown for clarity. In this illustrated embodiment, the gas turbine 105 is a simple cycle gas turbine engine. In other embodiments, complex cycles may be implemented via fuel-cooling of the gas path.

Referring again to FIG. 2, the gas turbine 105 comprises, in axial flow series, a low-pressure compressor 202, an interstage duct 203, a high-pressure compressor 204, a diffuser 205, a fuel injection system 206, a combustor 207, a high-pressure turbine 208, a low-pressure turbine 209, and a core nozzle 210. The fuel injection system 206 may be a lean direct fuel injection system. The high-pressure compressor 204 is driven by the high-pressure turbine 208 via a first shaft 211 and the low-pressure compressor 202 is driven by the low-pressure turbine 209 via a second shaft 212. In alternative examples, the gas turbine 105 may comprise more than two shafts.

In a geared turbofan engine the low-pressure turbine 209 also drives a fan 213 via a reduction gearbox 214. The reduction gearbox 214 receives an input drive from the second shaft 212 and provides an output drive to the fan 213 via a fan shaft 215. The reduction gearbox 214 may be an epicyclic gearbox, which may be of planetary, star or compound configuration. In further alternatives, the reduction gearbox 214 may be a layshaft-type reduction gearbox or another type of reduction gearbox. It will also be appreciated that the principles disclosed herein may be applied to a direct-drive type turbofan engine, i.e. in which there is no reduction gearbox between the low-pressure turbine 209 and the fan 213.

In operation, the fuel delivery system 201 is configured to obtain liquid hydrogen fuel from the cryogenic hydrogen storage tank 104 and provide the fuel to the fuel injection system 206 in gaseous form. This requires the amount of liquid fuel from the tank 104 to be controlled and a controlled amount of heat provided to the fuel to ensure the fuel in gaseous form is at a required temperature prior to injection into the gas turbine 105, or in alternative arrangements into a hydrogen fuel cell.

Figure 3:
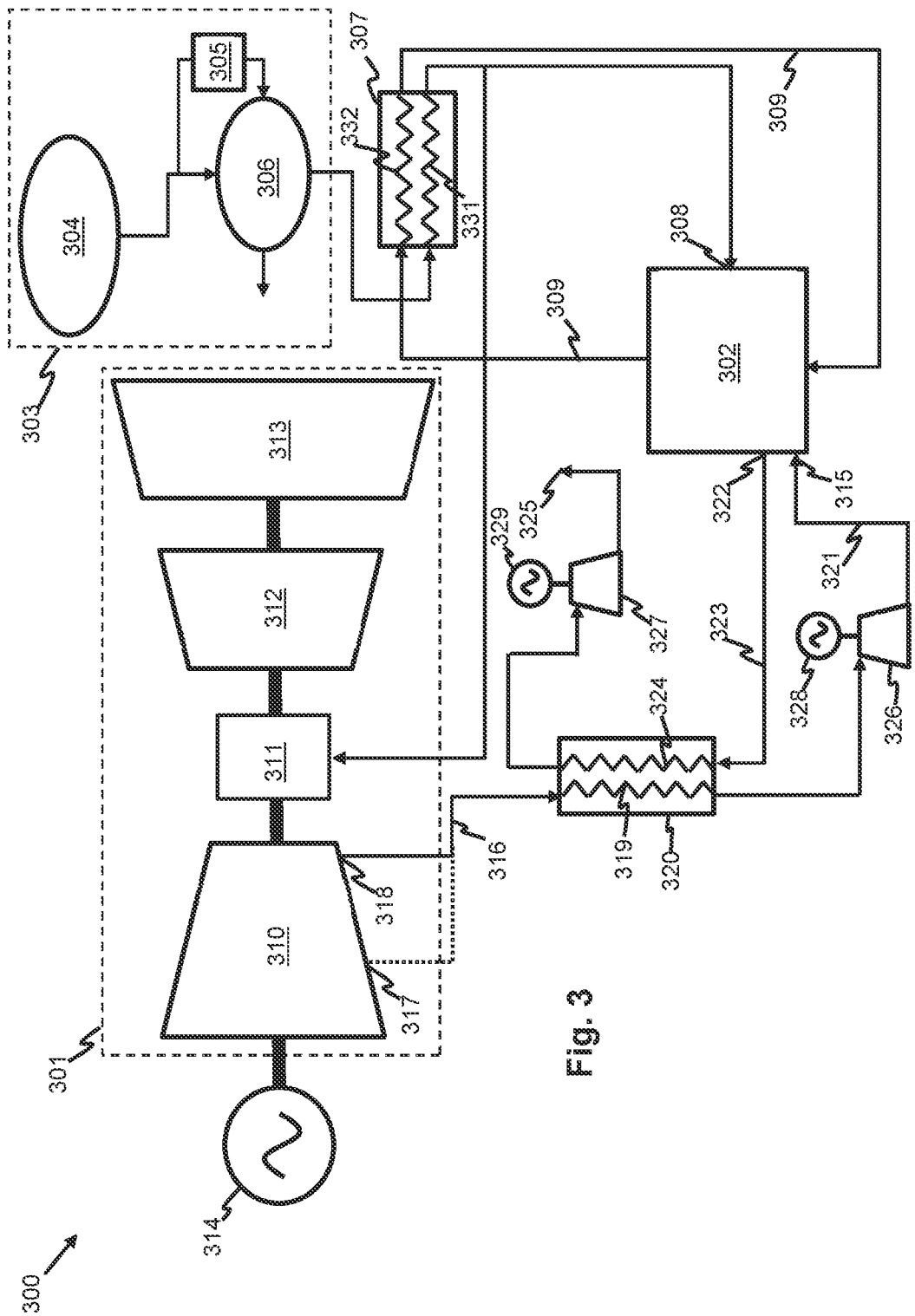
FIG. 3 is a schematic diagram of an example hydrogen fuelled aircraft power system.

FIG. 3 is a simplified schematic block diagram of a hydrogen fuelled power delivery system 300 comprising a gas turbine engine 301 and a fuel cell 302, in which air supply and cooling for the fuel cell 302 are integrated with the gas turbine engine 301 to improve overall efficiency. A hydrogen fuel supply system 303 provides a supply of hydrogen fuel to both the fuel cell 302 and the gas turbine engine 301. The hydrogen fuel supply system 303 provides a flow of gaseous hydrogen to a first fluid path 331 of a first heat exchanger 307.

Hydrogen fuel exiting the first heat exchanger 307 enters an anode inlet 308 of the fuel cell 302 and is reacted within the fuel cell 302 to generate electrical power. The fuel cell 302 may for example be a polymer electrolyte membrane fuel cell (PEMFC) or a solid oxide fuel cell (SOFC). The fuel cell 302 comprises a cooling flow path 309, which flows through the fuel cell 302 and through a second fluid path 332 of the first heat exchanger 307, thereby exchanging heat between fluid in the fuel cell cooling flow path 309 and the incoming hydrogen fuel. A radiator to extract excess heat from the fuel cell 302 is not required, as cooling of the fuel cell 302 can be achieved by transferring excess heat to the incoming hydrogen fuel. Waste heat generated by the fuel cell 302 is instead reused to heat the incoming fuel, thereby increasing overall efficiency. Operation of the pre-heater 305 can be adjusted according to the temperature of the fuel as measured exiting the first heat exchanger 307 so that a desired temperature of fuel entering both the fuel cell 302 and gas turbine engine 301 can be maintained.

The gas turbine engine 301 comprises in series a high-pressure compressor 310, a combustor 311, a high-pressure turbine 312 and a low-pressure turbine 313. Hydrogen fuel exiting the first heat exchanger 307 enters the combustor 311 and is combusted to drive the turbines 312, 313. In the illustrated example, the gas turbine engine 301 drives a first electrical machine 314 to generate electrical power, for example to drive one or more electrical propulsors. In alternative arrangements, the gas turbine engine 301 may drive a fan 314 or a propellor 314 to provide propulsion. The number of compressors and/or turbines may also differ in other arrangements, for example having a low pressure and high-pressure compressor as in the example in FIG. 2.

An air supply to the cathode inlet 315 of the fuel cell 302 is provided from the compressor 310 via a compressor bleed line 316. The position of the compressor bleed line 316 may be selected according to the temperature and pressure required. For example, in a first position 317 the temperature and pressure is lower than in a second position 318 downstream from the first position 317. Bleed air exiting the compressor 310 via the compressor bleed line 316 passes through a first fluid flow path 319 of a second heat exchanger 320 and through a cathode air inlet line 321 connected to the cathode inlet 315 of the fuel cell 302. A cathode exhaust 322 is connected to a cathode exhaust line 323, which passes through a second fluid flow path 324 of the second heat exchanger 320 towards an exhaust 325. The exhaust 325 may for example be directed towards a bypass path of the gas turbine engine 301.

The hydrogen fuel supply system 303 comprises a cryogenic hydrogen storage tank 304, a pre-heater 305 and a third heat exchanger 306. The pre-heater 305 and third heat exchanger 306 ensure that fuel provided to the fuel cell 302 and engine 301 is sufficiently heated prior to steady state operation of the system 300. Hydrogen fuel from the cryogenic tank 304, which may for example be at a temperature of around 25 K, passes through the third heat exchanger 306 and is heated to ambient temperature levels, for example around 290 K, through burning a small proportion of the fuel in the pre-heater 305. An air supply to the pre-heater 305 may be provided from the compressor 310 of the gas turbine engine 301. An exhaust of the pre-heater 305 may be connected to a bypass path of the gas turbine engine 301.

Additional turbines 326, 327 may be provided in the cathode air inlet line 321 and/or the cathode exhaust line 323 to recover energy from high pressure air flows passing through the lines 321, 322. A cathode air inlet turbine 326 may be provided in the cathode air inlet line 321, the turbine 326 connected to drive a second electrical machine 328 to generate further electrical power. A cathode exhaust turbine 327 may be provided in the cathode exhaust line 323, the cathode exhaust turbine 327 connected to drive a third electrical machine 329 to generate further electrical power. Air flow through the cathode air inlet and outlet lines 321, 323 can be controlled through operation of the turbines 326, 327 and the load extracted from the turbines by the electrical machines 328, 329. Heat transferred from air in the compressor bleed line 316 to the exhaust air in the cathode air outlet line 323 enables a higher energy recovery factor using the cathode air outlet turbine 327.

Each of the electrical machines 314, 328, 329 are typically operated as generators during operation of the system 300, but may also operate in reverse as motors, for example to start operation of the gas turbine 301.

Figure 4:
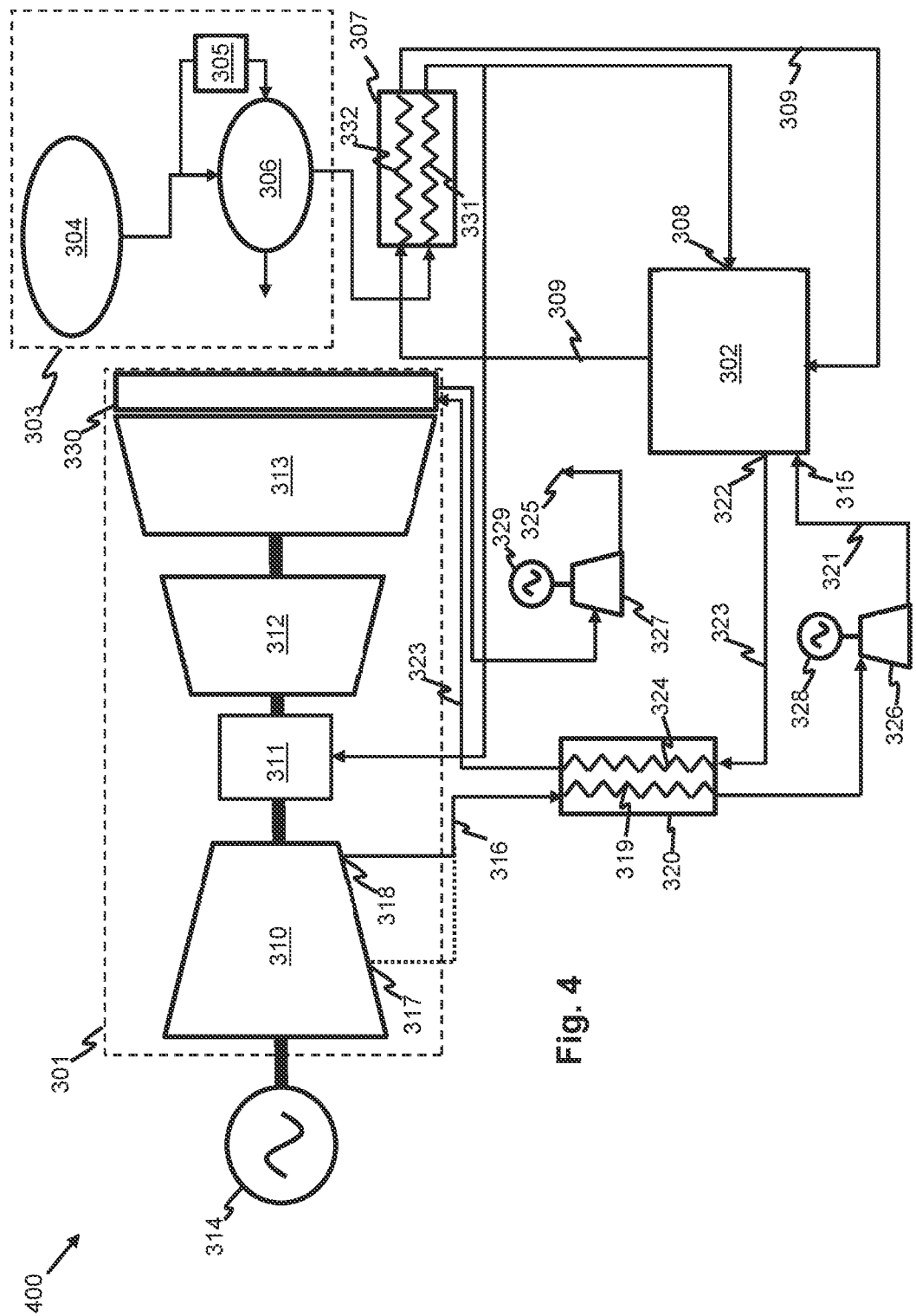
FIG. 4 is a schematic diagram of an alternative example hydrogen fuelled aircraft power system.

In an alternative example hydrogen fuelled power delivery system 400 illustrated in FIG. 4, a recuperator 330 may be added to an outlet of the low-pressure turbine 313 to further enhance energy recovery. The cathode exhaust line 323 passes through the recuperator 330 prior to the cathode exhaust turbine 327, gaining further heat from the low-pressure turbine 313 exhaust and thereby further enhancing energy recovery through the cathode exhaust turbine 327 and third electrical machine 329. Other components of the system 400 are as described above in relation to the system 300 of FIG. 3.

Operating a system as described above may result in a reduction in fuel requirement for the gas turbine 301 through use of an appropriately sized fuel cell 302. The fuel cell 302 may for example be sized to provide a level of electrical power that corresponds to a peak designed power for the aircraft electrical systems. The proportion of power provided by the fuel cell 302 may for example be up to around 1-5% in terms of overall fuel consumption. A proportion of compressor air passing into the compressor bleed line 316 in such an example may be up to around 2.5 to 3%. Overall system efficiency in comparison with a conventional kerosene fuelled gas turbine engine may be increased, with only a small weight addition due to the increase in weight of the fuel cell 302 and associated components.

An advantage of the system as described herein is that the gas turbine engine 301 can operate as a purely propulsive unit, enabling a significant improvement in efficiency, while the fuel cell 302 generates an electrical supply more efficiently than through using an electrical machine for providing electrical power for electrical systems in the gas turbine engine 301 and elsewhere in the aircraft. The system 300, 400 may be particularly applicable in large aircraft applications where engine off-takes and liquid hydrogen pumping power requirements are significant and may otherwise have a deleterious impact on a pure hydrogen fuelled gas turbine system.

A small portion of bleed air is required to provide an air supply to the fuel cell 302, which can be taken from the gas turbine compressor 310. The second heat exchanger and turbines 326, 327 allow power to be recovered from the compressor 310 pressure rise which is proportional to the pressure gain itself. With the outlet at the second position 318 the power recovery is higher, but the bleed losses are also higher.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

What is claimed is:

1. A hydrogen-fuelled aircraft power system comprising:
a hydrogen fuel supply system configured to provide a flow of gaseous hydrogen fuel;
a polymer electrolyte fuel cell having an anode inlet arranged to receive a first portion of the flow of gaseous hydrogen fuel from the hydrogen fuel supply system, a cathode air inlet, and a cathode exhaust;
a gas turbine engine having a compressor, a combustor arranged to receive a second portion of the flow of gaseous hydrogen fuel from the hydrogen fuel supply system, and a turbine;
the hydrogen fuel supply system being arranged such that in operation of the hydrogen fuel supply system the first and second portions of the flow of gaseous hydrogen are provided in parallel to the anode inlet and the combustor, and the hydrogen-fuelled aircraft power system being arranged to provide main compressor discharge air from the compressor directly to the combustor in parallel with compressor bleed air from the compressor being provided to the cathode air inlet; and
a first heat exchanger having first and second fluid flow paths, the first fluid flow path of the first heat exchanger being connected between a compressor bleed line arranged to carry the compressor bleed air and a cathode air inlet line connected to the fuel cell cathode air inlet, and the second fluid flow path being connected between a cathode exhaust line from the fuel cell cathode exhaust and an exhaust of the hydrogen-fuelled aircraft power system,
wherein the first heat exchanger is configured to transfer heat from the compressor bleed air in the first fluid flow path to exhaust gas in the second fluid flow path.

2. The hydrogen-fuelled aircraft power system of claim 1, further comprising a first electrical machine connected to the gas turbine engine.

3. The hydrogen-fuelled aircraft power system of claim 1, wherein the gas turbine engine is part of a turboprop engine, the hydrogen-fuelled aircraft power system further comprising a propellor connected to the gas turbine engine.

4. The hydrogen-fuelled aircraft power system of claim 1, wherein the gas turbine engine is part of a turbofan engine, the hydrogen-fuelled aircraft power system further comprising a fan connected to the gas turbine engine.

5. The hydrogen-fuelled aircraft power system of claim 1, wherein the hydrogen fuel supply system comprises a cryogenic hydrogen storage tank, a pre-heater and a second heat exchanger, the hydrogen fuel supply system configured to provide the flow of gaseous hydrogen fuel from the second heat exchanger heated by the pre-heater.

6. The hydrogen-fuelled aircraft power system of claim 1, wherein the cathode exhaust line comprises a cathode exhaust turbine connected to drive a third electrical machine.

7. The hydrogen-fuelled aircraft power system of claim 6, wherein the second fluid flow path of the first heat exchanger is between the cathode exhaust and the cathode exhaust turbine.

8. The hydrogen-fuelled aircraft power system of claim 6, wherein the gas turbine engine comprises a recuperator at an outlet of the turbine, the cathode exhaust line passing through the recuperator between the second fluid flow path of the first heat exchanger and the cathode exhaust turbine.

9. The hydrogen-fuelled aircraft power system of claim 1, wherein the cathode air inlet line comprises a cathode air inlet turbine connected to drive a second electrical machine.

10. The hydrogen-fuelled aircraft power system of claim 1, further comprising a second heat exchanger having first and second fluid flow paths, the first fluid flow path of the second heat exchanger being between the hydrogen fuel supply system and the fuel cell anode inlet, the fuel cell cooling flow path passing through the second fluid flow path of the second heat exchanger.

11. A hydrogen-fuelled aircraft power system comprising:
a hydrogen fuel supply system configured to provide a flow of gaseous hydrogen fuel;
a hydrogen fuel cell having an anode inlet arranged to receive a first portion of the flow of gaseous hydrogen fuel from the hydrogen fuel supply system, a cathode air inlet, and a cathode exhaust and a cooling flow path;
a gas turbine engine having a compressor, a combustor arranged to receive a second portion of the flow of gaseous hydrogen fuel from the hydrogen fuel supply system, and a turbine;
a first heat exchanger having first and second fluid flow paths, the first fluid flow path of the first heat exchanger being between the hydrogen fuel supply system and the fuel cell anode inlet, the fuel cell cooling flow path passing through the second fluid flow path of the first heat exchanger; and
a second heat exchanger having first and second fluid flow paths, the first fluid flow path of the second heat exchanger connected between a compressor bleed line and a cathode air inlet line connected to the fuel cell cathode air inlet, a cathode exhaust line from the fuel cell cathode exhaust passing through the second fluid flow path of the second heat exchanger towards an exhaust,
wherein the cathode air inlet line comprises a cathode air inlet turbine connected to drive a second electrical machine.

12. A method of operating a hydrogen-fuelled aircraft power system, the method comprising:
providing a flow of gaseous hydrogen fuel from a hydrogen fuel supply system;
passing the flow of gaseous hydrogen fuel from the hydrogen fuel supply system through a first fluid flow path of a first heat exchanger;
receiving a first portion of the flow of gaseous hydrogen fuel from the hydrogen fuel supply system at an anode inlet of a hydrogen fuel cell, the hydrogen fuel cell having a cathode air inlet, a cathode exhaust and a cooling flow path;
receiving a second portion of the flow of gaseous hydrogen fuel from the hydrogen fuel supply system at a combustor of a gas turbine engine, the gas turbine engine having a compressor and a turbine;
passing cooling fluid through the cooling flow path in the hydrogen fuel cell through a second fluid flow path of the first heat exchanger;
passing discharge air from the compressor of the gas turbine engine directly to the combustor of the gas turbine engine;
passing bleed air from the compressor through a compressor bleed line, through a first fluid flow path of a second heat exchanger and a cathode air inlet line to the fuel cell cathode air inlet; and
passing exhaust gas from the cathode exhaust through a second fluid flow path of the second heat exchanger to an exhaust to transfer heat from the bleed air in the first fluid flow path to the exhaust gas in the second fluid flow path.

13. The method of claim 12, further comprising driving a first electrical machine with the gas turbine engine.

14. The method of claim 12, wherein the gas turbine engine is part of a turboprop engine, the method comprising driving a propellor connected to the gas turbine engine.

15. The method of claim 12, wherein the gas turbine engine is part of a turbofan engine, the method comprising driving a fan connected to the gas turbine engine.

16. The method of claim 12, wherein the hydrogen fuel supply system comprises a cryogenic hydrogen storage tank, a pre-heater and a third heat exchanger, the hydrogen fuel supply system providing the flow of gaseous hydrogen fuel from the third heat exchanger heated by the pre-heater.

17. The method of claim 12, wherein the cathode air inlet line comprises a cathode air inlet turbine connected to drive a second electrical machine.

18. The method of claim 12, wherein the cathode exhaust line comprises a cathode exhaust turbine connected to drive a third electrical machine.

19. The method of claim 18, wherein the second fluid flow path of the second heat exchanger is between the cathode exhaust and the cathode exhaust turbine.

20. The method of claim 18, wherein the gas turbine engine comprises a recuperator at an outlet of the turbine, the cathode exhaust line passing through the recuperator between the second fluid flow path of the second heat exchanger and the cathode exhaust turbine.

\* \* \* \* \*